Patented Nov. 16, 1937

2,099,328

UNITED STATES PATENT OFFICE 2,099,328

METHOD OF HARDENING SOIL

Leo Casagrande, Berlin-Charlottenburg, Germany

No Drawing. Application January 7, 1935, Serial No. 736. In Germany January 16, 1934

14 Claims. (Cl. 204—1)

This invention relates to methods of hardening or petrifying soils, especially soils containing clay, and more particularly to methods depending upon the principle of electrolysis.

Soils are sometimes hardened or petrified to increase their bearing power for foundation purposes, and the degree of safety against earth movements. This is often effected by injecting liquids under high pressure into the voids of the soil, and permitting the liquids to harden in the said voids by chemical interaction. The injection method, however, is successfully utilized in such soils only as possess relatively large voids, mainly sands. In soils containing a very fine-grained, plastic fraction,—which soils will hereinafter be referred to, for brevity, as clay soils,—on the other hand, it is practically impossible to employ injections, for the resistance of the very small voids to the flow of the liquid is so tremendous that, even under the greatest of pressures, applied over a long period of time, only a thin surface layer of the soil can be caused to penetrate and become hardened.

To harden clay soils, therefore, other methods are utilized involving the removal of the water of the soil, as by air drying, or heating, or by driving the water out through the use of externally applied pressure. As such methods are not always sufficiently effective, they are supplemented, in the case of extensive clay deposits, by very cumbersome and expensive drilling of holes in the soil, and heating the drill holes either electrically, or by means of combustible gases that are circulated and burnt in the drill holes.

An object of the present invention is to provide a new and improved method of hardening soils, and more particularly clay soils, of any desired area and depth.

Another object is to provide a novel electrolytical procedure for the precipitation in the soil of petrifying chemical compounds, particularly the compounds of aluminum, without employing injections.

Still another object is to reduce the cost of treating soils.

According to the preferred embodiment of the invention, an aluminum electrode and a copper electrode are introduced into the soil at some distance from each other and are connected together by an electric conductor. The electrodes may have sizes and shapes adapted to local conditions; they may, indeed, be constituted of piles, whose bearing capacity it is desired to increase in accordance with this invention, or they may serve some other purpose additional to that of electrodes. The galvanic current which is thus created between the two electrodes produces a gradual hardening or petrification of that portion of the soil through which the current passes. This hardening process takes place regardless of the amount of water which is contained in the clay, or which may be standing on the surface of the clay.

The hardening process may be accelerated by increasing the amount of electric current passing between the electrodes through the soil. This may be effected, for example, by connecting the positive pole of a source of direct current to the aluminum electrode and the negative pole to the copper electrode. So long as the current is applied, the clay near the aluminum electrode dries out at a rate depending on the voltage and the amount of current passing through the soil, and free water and gas bubbles escape through the clay surface surrounding the copper electrode. In the absence of a water supply at the aluminum electrode, the surrounding soil would dry out very quickly, thus decreasing the electric conductivity of this portion of the soil to such an extent that the electrolytic hardening process would become terminated before a sufficient amount of aluminum compounds have become precipitated in the soil. To prevent the complete drying out of the clay, and the resulting loss in electric conductivity, therefore, it is desirable to keep the clay surface surrounding the aluminum electrode constantly flooded with water. The amount of electric current used, furthermore, should not be so large that the temperature increase of the soil will become excessive, as this would cause a rapid loss of water and the formation of large, shrinkage cracks. A drying out of this sort is almost entirely a physical change, and not the kind of hardening that is produced by sufficient electro-chemical precipitation of petrifying compounds. The amount of electric current that may properly be used in addition to the self-induced, galvanic current is, therefore, limited. It is usually necessary to make preliminary tests to determine the conditions under which optimum results may be obtained. The distance of the electrodes from each other, too, is sometimes better chosen by trial and error, as too short a distance tends to produce a greater heating effect than is sometimes desirable. The process is continued, under a current of suitable voltage, until the soil has reached the required degree of hardening.

The physical properties of the clay, after being treated according to the above description, are very much improved from the standpoint of the requirements of foundation engineering. The treated clay is much harder than the same clay of the same water content when not so treated, and it does not swell or slake when immersed in water. Regardless of whether the soil, before treatment, was in an undisturbed state, still possessing its natural structure, or in a remolded state, there is an extraordinary decrease in the compressibility of the clay after such treatment.

Though the theory of the phenomenon is not understood, particularly as the chemistry of clay compounds is very obscure, this decrease in compressibility would seem to indicate that what takes place is somewhat as follows: The colloidal fractions of clay soils contain condiserable amounts of sodium compounds which are very soft. Aluminum ions from the aluminum electrode are carried by the electric current through the soil and replace the sodium cations contained in the colloidal fraction of the clay. The resulting aluminum compounds, thus appearing in the soil, have an exceedingly hard texture. Though this hypothesis is tentatively put forward in explanation of the phenomenon, however, it is to be understood that the invention does not reside in theories, but in actual accomplishments, as herein described.

Whatever the theory, the treatment results in the formation of an entirely new soil structure in which the aluminum compounds are precipitated in the soil by the electrolytical process. As this new structure differs fundamentally from the ordinary, natural-clay structure in that it is not affected by water, the treatment of clay soils according to this invention results essentially in a chemical, irreversible cementation of the mineral particles of the soil. A secondary effect is a reduction in water content, the amount of which depends on the rate at which the hardening process is artificially accelerated by means of the electric current.

Though aluminum has been described above as the positive electrode, and copper as the negative electrode, it is not to be concluded that these are the only materials that may be employed in the treatment of soils according to this invention. The copper electrode, for example, may be replaced by any other metal if additional electric current is available for carrying on the process, as above described. If the self-induced galvanic current is alone relied upon, however, then the negative electrode should be constituted of a metal that is more electropositive, and that yields a high voltage when connected with the aluminum. For example, using aluminum and copper—

$$Al—Cu(-1.28)—(+1.34)=2.62 \text{ volt.}$$

If the copper is replaced by iron, however, $$Al—Fe(-1.28)—(-0.43)=0.85 \text{ volt.}$$

The use of the iron in place of the copper will naturally, therefore, lengthen the time of the hardening process.

The efficiency of the electrolytic treatment may be improved, for some types of clay, by supplying appropriate chemical agents to the soil surrounding the positive electrode (which may or may not be aluminum) or through the electrodes. Aluminum acetate and aluminum sulphate are examples of such compounds. The acceleration of the hardening process is then due to a larger precipitation of aluminum compounds in the soil. Also, more than two electrodes may be employed under certain circumstances; for example, aluminum and copper electrodes may be connected alternately in series with the same conductor.

Further modifications will occur to persons skilled in the art, and all such are considered to fall within the spirit and scope of the invention, as defined in the appended claims.

What is claimed is:

1. A method of hardening soils containing colloidal clay that comprises introducing two electrodes into the soil and connecting the electrodes by a conductor, one of the electrodes containing aluminum, and the other electrode being more electropositive, and supplying an aluminum compound to the soil surrounding the aluminum electrode.

2. A method of hardening soils containing colloidal clay that comprises introducing two or more electrodes into the soil, one group of the electrodes being constituted of aluminum, and another group of electrodes being constituted of a metal which is more electropositive, and connecting the electrodes by a conductor to cause a galvanic current to pass through the soil between the electrodes.

3. A method of hardening soils containing colloidal clay that comprises introducing two or more electrodes into the soil, one group of the electrodes containing aluminum, and another group of electrodes being more electropositive, connecting the electrodes by a conductor, and maintaining the soil near the said one group of electrodes wet to cause a galvanic current to pass through the soil between the electrodes.

4. A method of hardening soils containing colloidal clay that comprises introducing two or more electrodes into the soil, one or more of the electrodes containing aluminum, the other electrode or electrodes being constituted of a metal, and connecting the said one or more electrodes to the positive pole and the said other electrode or electrodes to the negative pole of a source of direct current to cause an electric current to pass through the soil between the electrodes.

5. A method of hardening soils containing colloidal clay that comprises introducing two or more electrodes into the soil, one or more of the electrodes containing aluminum, the other electrode or electrodes being more electropositive, and connecting the electrodes by a conductor to cause an electric current to pass through the soil between the electrodes.

6. A method of hardening soils containing colloidal clay that comprises introducing two or more electrodes into the soil, one or more of the electrodes being constituted of aluminum, the other electrode or electrodes being constituted of a metal, and connecting the said one or more electrodes to the positive pole and the said other electrode or electrodes to the negative pole of a source of direct current to cause an electric current to pass through the soil between the electrodes.

7. A method of hardening soils containing colloidal clay that comprises introducing two or more electrodes into the soil, one or more of the electrodes containing aluminum, the other electrode or electrodes being constituted of a metal, connecting the said one or more electrodes to the positive pole and the said other electrode or electrodes to the negative pole of a source of direct current to cause a current to pass through the soil between the electrodes, and supplying an aluminum compound to the soil surrounding the aluminum electrode or electrodes.

8. A method of hardening soils containing colloidal clay that comprises introducing two or more electrodes into the soil, one or more of the electrodes being constituted of aluminum, the other electrode or electrodes being constituted of a metal, connecting the said one or more electrodes to the positive pole and the said other electrode or electrodes to the negative pole of a source of direct current to cause an electric current to pass through the soil between the electrodes, and supplying an aluminum compound to the soil surrounding the electrode or electrodes constituted of aluminum.

9. A method of hardening clay and clay-containing soils that comprises introducing two or more electrodes into the soil, one group of electrodes being constituted of aluminum, and another group of electrodes being constituted of a metal, and connecting the electrodes by a conductor to cause a galvanic current to pass through the soil between the electrodes.

10. A method of hardening clay and clay-containing soils that comprises introducing two or more electrodes into the soil, one or more of the electrodes being constituted of aluminum, the other electrode or electrodes being constituted of a metal, and connecting the said one or more electrodes to the positive pole and the said other electrode or electrodes to the negative pole of a source of direct current of suitable voltage, to cause an electric current to pass through the soil between the electrodes.

11. A method of hardening clay and clay-containing soils that comprises introducing two or more electrodes into the soil, one group of electrodes being constituted of aluminum, and another group of electrodes being constituted of a metal, connecting the electrodes by a conductor to cause a galvanic current to pass through the soil between the electrodes, and supplying a chemical agent consisting of an aluminum compound to the soil surrounding the aluminum electrodes.

12. A method of hardening clay and clay-containing soils that comprises introducing two groups of electrodes comprising two or more electrodes into the soil, one of the group of electrodes containing aluminum, connecting one group of electrodes to the positive pole and the other group to the negative pole of a source of direct current of suitable voltage, whereby the electric current will pass through the soil, and supplying a chemical agent consisting of an aluminum compound to the soil surrounding the said one group of electrodes.

13. A method of hardening soils containing colloidal clay that comprises introducing two electrodes into the soil and connecting the electrodes by a conductor, one of the electrodes containing aluminum, the other electrode being electro-positive relative to aluminum, and supplying aluminum acetate to the soil surrounding the said one electrode.

14. A method of hardening soils containing colloidal clay that comprises introducing two electrodes into the soil and connecting the electrodes by a conductor, one of the electrodes containing aluminum, the other electrode being electro-positive relative to aluminum, and supplying aluminum sulphate to the soil surrounding the said one electrode.

LEO CASAGRANDE.